H. N. STRONG.
Tobacco-Hangers.
No. 150,985. Patented May 19, 1874.
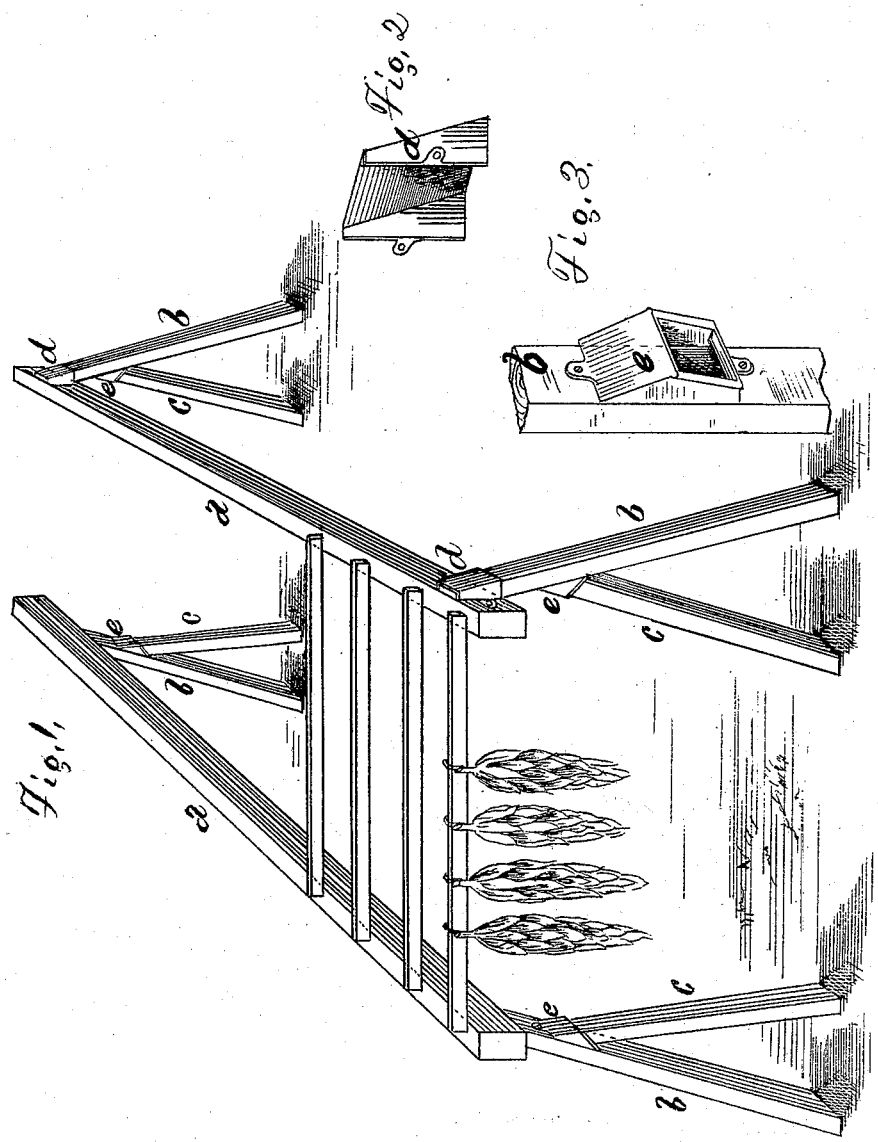

UNITED STATES PATENT OFFICE.

HENRY N. STRONG, OF PORTLAND, CONNECTICUT.

IMPROVEMENT IN TOBACCO-HANGERS.

Specification forming part of Letters Patent No. 150,985, dated May 19, 1874; application filed September 16, 1873.

*To all whom it may concern:*

Be it known that I, HENRY N. STRONG, of Portland, in the county of Middlesex and State of Connecticut, have invented an Improvement in Tobacco - Wilting Horses, of which the following is a specification, reference being had to the accompanying drawings, in which—

Figure 1 is a perspective view of two of the horses put up in the field for use. Fig. 2 is a detached enlarged view of the metallic socket for one of the longer legs of the horse. Fig. 3 is a detached enlarged view of the metallic socket for one of the shorter legs of the horse.

Tobacco-plants, after being cut in the field, need to be wilted by the air and sun before being carried into the curing-house. Heretofore, this wilting has generally been accomplished by laying the plant on the ground for a while, and then turning the plant over, so as to expose the other side to the sun and air, and allowing the plant to lie thus a while longer. Since that it has become, or is now becoming, customary to spit or otherwise hang the plants upon lath. It is desirable that the plants be put upon the lath as soon as cut, and that the lath thus loaded be hung a while in the open air, in order to give the plants time to wilt before being carried into the curing - house. For this purpose wooden horses are convenient, two of these horses being set parallel to each other a little less than the length of a lath apart, so that the lath can be supported by the ends upon the two horses. These horses should be about five feet high. My present invention is a horse for this purpose.

The letter $a$ indicates a wooden rail, which forms the body of the horse. Each horse has two longer legs, $b\ b$, and two shorter legs, $c\ c$. The tops of the two longer legs are attached directly to the rail $a$, but the shorter legs are attached to the side of the longer legs, the foot of the shorter legs falling just even with, or a trifle outside, the line of gravity descending from the rail $a$. By means of this peculiar construction of the legs a footway is left clear between the two horses, so that a person can enter to deposit or place the loaded lath. The letters $d\ d$ indicate metallic sockets, permanently attached to the side of the rail $a$, for the top ends of the legs $b\ b$, and the letters $e\ e$ indicate metallic sockets attached to the sides of the legs $b\ b$ for the upper ends of the legs $c\ c$. The legs can be readily detached from their sockets, and the whole compacted into a small bundle for transportation—in this case an obvious and great convenience.

I am aware that forms of building-supports are connected to the sides of beams and rafters much as I connect the shorter legs of my horse to the longer legs, as shown, for instance, in the United States Patent for tobacco-barn to B. A. Davis, dated November 5, 1867, and in Plate 23 of designs for roofs, Nicholson Practical Builder, vol. 1, London, 1847; but this does not constitute my invention, and I do not intend in these Letters Patent in anywise to fetter operations in building. My invention is a new article of manufacture, complete in itself, and designed to serve a specific purpose, and I will now point out its essential features, thereby showing that it is quite a different thing from a mere manner of attaching a side support to a beam or rafter.

My device must have, first, the long rail or bar $a$ at the top; second, the two longer legs, $b$, detachable from the sockets $d$; third, the two shorter legs, $c$, on the sides of the longer legs, detachable from the sockets $e$.

The purposes, the peculiar purposes that this construction serves, aside from the general purpose of supporting tobacco, are, first, by means of the shorter legs $c$ projecting as little as is possible beyond a perpendicular dropped from the bars $a$, and yet hold the horse in position, I am enabled to leave a path clear, or nearly so, between the two horses, wherein a man may enter between the horses and not stumble over the legs of the horse, which he would be apt to do if the horse were of the common construction, he entering in the haste of active work with one or two laths loaded with tobacco in his hands; second, by making all the legs detachable from their sockets the whole can be stored away in small space during all the year, except the few days when wanted for use, and then the farmer can load all the parts of the two horses like a lot of poles into his tobacco-wagon, carry them to the field, quickly set the horses up in the field;

and as readily take the horses apart when the tobacco is gathered, and retransport the parts to the barn—a great and manifest advantage over a horse that is permanent in its form.

It is perfectly evident that the invention is quite another thing than the methods referred to for attaching supports to the sides of beams and rafters.

I claim as my invention—

As a new article of manufacture, a tobacco-horse composed of the top bar $a$, the sockets $d$, the longer legs $e$ detachable from their sockets, the sockets $e$, the shorter legs $c$ detachable from their sockets, and falling nearly or quite within a perpendicular dropped from the top bar, the whole combined substantially as shown and described.

H. N. STRONG.

Witnesses:
   WM. E. SIMONDS,
   JOHN POLLITT.